United States Patent [19]

Stack

[11] Patent Number: 4,872,709

[45] Date of Patent: Oct. 10, 1989

[54] PIPE ALIGNING APPARATUS

[75] Inventor: Eugene V. Stack, Bay City, Mich.

[73] Assignee: The Dow Chemical Company, Midland, Mich.

[21] Appl. No.: 490,939

[22] Filed: May 2, 1983

[51] Int. Cl.[4] .............................................. F16L 55/00

[52] U.S. Cl. ...................................... 285/39; 285/406; 81/426.5; 81/424.5; 29/267; 29/272; 29/238

[58] Field of Search ................. 285/406, 364, 420, 39; 81/300, 367, 368, 369, 370, 371, 372, 373, 374, 375, 376, 377, 378, 379, 380, 418, 424.5, 426.5; 29/268, 271, 272, 238

[56] References Cited

U.S. PATENT DOCUMENTS

| | | | |
|---|---|---|---|
| 471,437 | 3/1892 | Robinson | 29/238 |
| 2,190,220 | 9/1942 | Schilling | 285/420 X |
| 2,555,591 | 6/1951 | Kane | 81/426.5 |
| 3,215,456 | 11/1965 | Schmid | 285/420 X |
| 3,316,914 | 5/1967 | Collito | 285/330 X |
| 3,372,949 | 3/1968 | McLay | 285/364 |
| 3,698,419 | 10/1972 | Tura | 81/418 |
| 3,958,468 | 5/1976 | Weller | 81/368 |
| 4,147,077 | 4/1979 | Tasato | 81/373 |
| 4,313,625 | 2/1982 | West | 285/55 |

FOREIGN PATENT DOCUMENTS

| | | | |
|---|---|---|---|
| 359577 | 2/1962 | Switzerland | 285/364 |
| 15358 | of 1884 | United Kingdom | 285/39 |

*Primary Examiner*—Gary L. Smith
*Assistant Examiner*—Eric K. Nicholson
*Attorney, Agent, or Firm*—Robert Ingram; Thomas Zindrick; Thomas A. Ladd

[57] ABSTRACT

A toggle clamp is fitted with opposed pipe flange engaging jaws and provides a rapid means of alignment and positioning of flanged pipe during assembly; particularly suited for use with split "V" clamp joints.

3 Claims, 2 Drawing Sheets

PIPE ALIGNING APPARATUS

Lined pipe or lined conduit have been known for many years. One particularly desirable and serviceable variety of lined conduit are those conduits lined with synthetic resinous thermoplastic liners, such as tetrafluoroethylene polymers, vinylidene fluoride polymers, propylene polymers and the like. For many applications requiring higher pressure, heavier walled conduits, such as Schedule 40 pipe are employed. However, many applications do not require such pressures and can utilize lighter pipe, for example Schedule 10. One particularly desirable light weight pipe and joint therefore is disclosed in U.S. Pat. No. 4,313,625, the teaching of which is herewith incorporated by reference thereto. The pipe joints are formed by initially flaring the ends of the lined conduit to provide integral flanges thereof, providing a loose ring behind the flanges of adjacent conduits to be joined and applying a split "V" clamp over the loose rings to thereby draw flanged portions of the liner in contact and provide a generally fluid tight joint. In joining conduits or lined pipe in this manner, oftentimes some difficulty is encountered in aligning the conduits, positioning the loose rings and applying the split "V" clamp. Oftentimes two men are required to assemble such a connection. Similarly, where conventional flanged joints are employed, difficulties may be encountered in aligning the flanges for bolting.

It would be desirable if there were available an improved apparatus particularly suited for the alignment of pipe and similar conduit.

It would also be desirable if there were available an apparatus for the alignment of pipe and fitting to aid in the assembling of a joint.

It would also be desirable if such an apparatus were light in weight and could be readily handled by one man.

These benefits and other advantages in accordance with the present invention are achieved in a pipe clamp comprising a toggle clamp having first and second opposed jaws, the opposed jaws each being bifurcated to provide first and second jaw portions defining therebetween a pipe receiving recess, each of the jaw members defining pipe engaging projections, the pipe engaging projections being generally symmetrically disposed on the jaws, the projections adapted on closing of the toggle clamp to engage flange members at generally diametrically opposed locations, said locations lying in a plane generally normal to the plane of the toggle clamp.

Further features and advantages of the present invention will become more apparent from the following specification taken in connection with the drawing wherein FIG. 1 is a view of a clamp in accordance with the invention;

Figure 1:
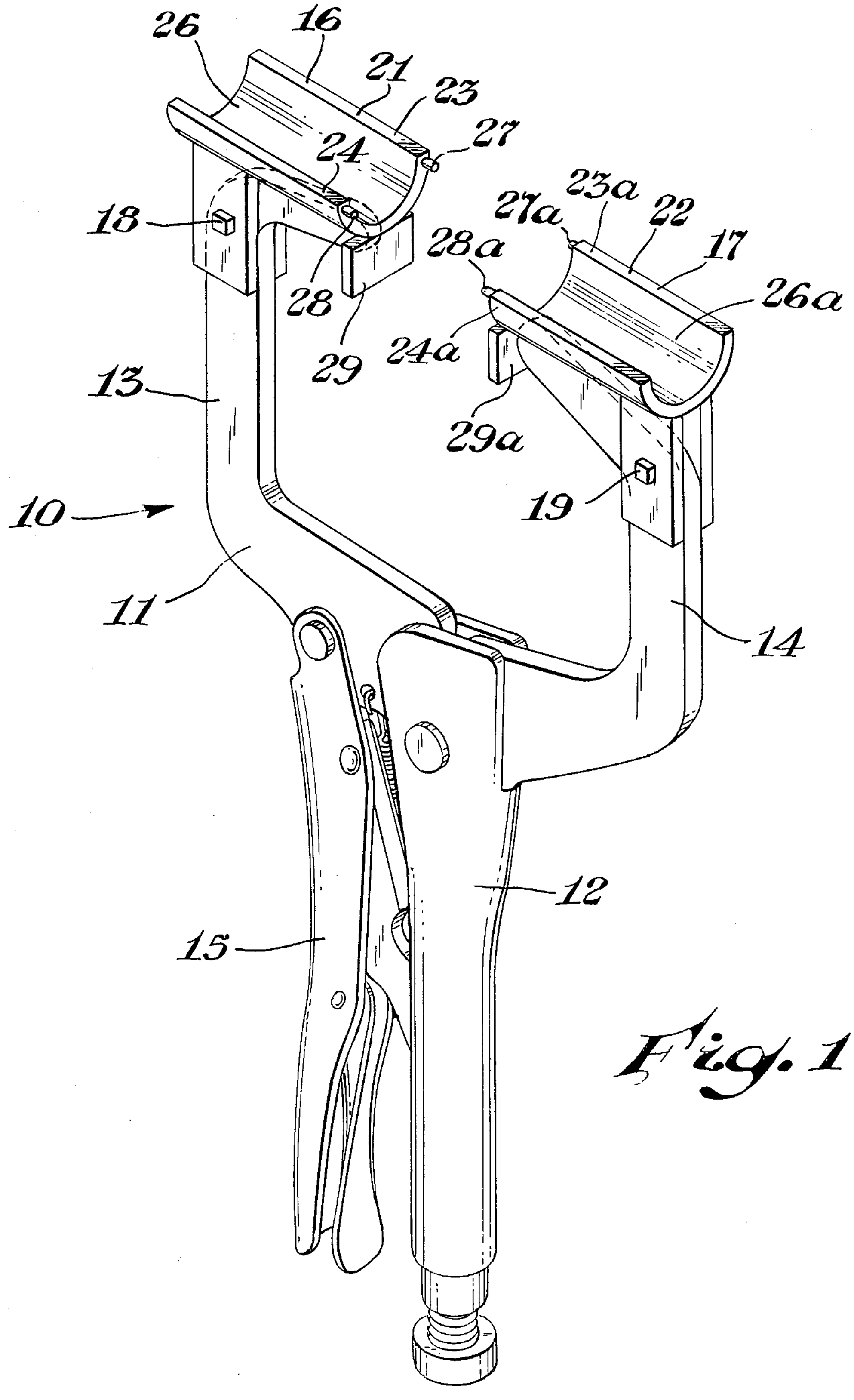
Figure 2:
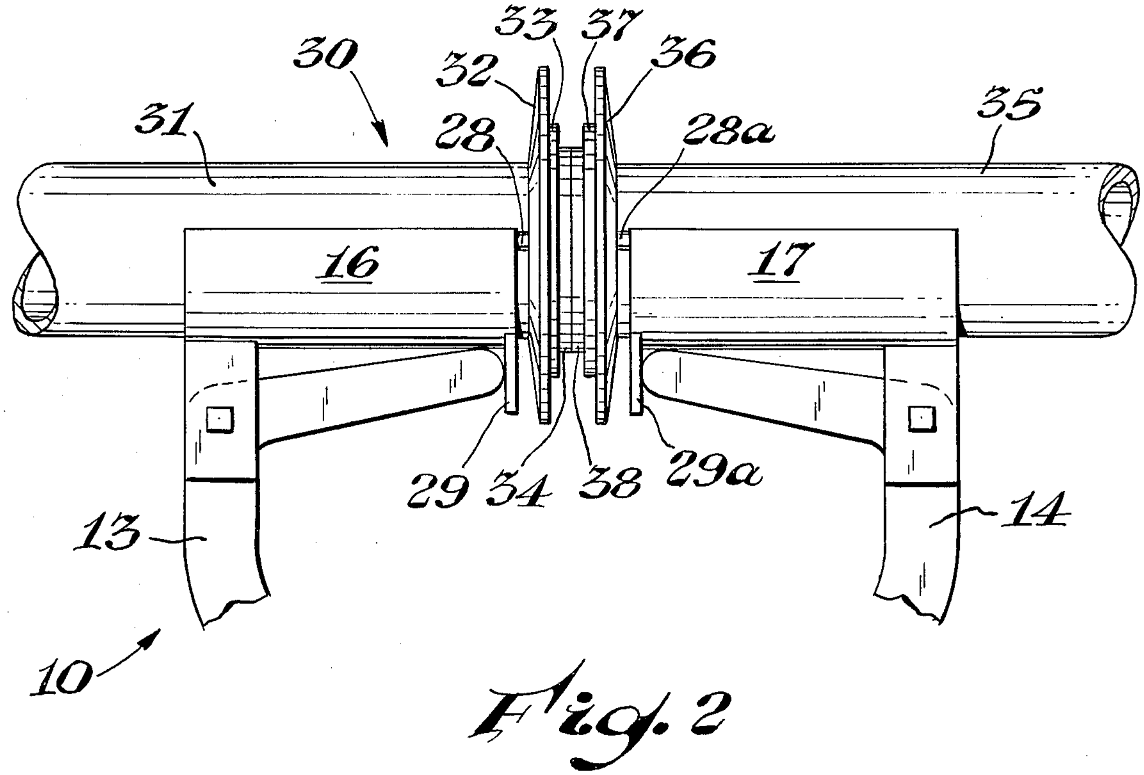
FIG. 2 is a fractional view of a clamp generally in accordance with FIG. 1 in engagement with flanges on lined pipe ends.

In FIG. 1 there is schematically depicted a clamp in accordance with the present invention generally designated by the reference numeral 10. The clamp 10 comprises in cooperative combination a manually operated adjustable toggle clamp 11. The toggle clamp 11 has a handle portion 12, a first jaw 13 and a second jaw 14. The toggle clamp 11 on selective movement of the lever 15, causes the jaws 13 and 14 to be selectively positioned away from each other or towards each other. Each of the jaws 13 and 14 have pivotally affixed thereto pipe engaging members 16 and 17. The members 16 and 17 are of generally like construction and are pivotally affixed to the jaws 13 and 14 by means of pivots 18 and 19. Pivots 18 and 19, for convenience, may be a bolt, roll pin or like attachment means. Each of the pipe receiving members 16 and 17 terminate remote from the clamp 11 in generally semicylindrical shell members 21 and 22. The semicylindrical shell members 21 and 22 define first and second jaw legs 23 and 24, and 23*a* and 24*a*. Between the legs 23 and 24 and between legs 23*a* and 24*a* are defined pipe receiving recesses 26 and 26*a*. On closure of the clamp 11 to a flange engaging position, the recesses 26 and 26*a* are generally coaxially disposed. Each of the legs 23, 24, 23*a* and 24*a* defines flange engaging projections 27, 28, 27*a* and 28*a*. The flange engaging projections 27 and 28 are symmetrically disposed about the recess 26. The flange engaging projections 27*a* and 28*a* are symmetrically disposed about the recess 26*a*. The flange engaging projections 27 and 27*a*, and 28 and 28*a*, respectfully, are in opposed facing relationship. The pipe receiving members 16 and 17 have dependent flange portions 29 and 29*a* respectively which engage terminal portions of the jaw 13 and 14 when the clamp 11 is in a closed flange engaging position. The projections 27 and 28 and 27*a* and 28*a* are positioned to engage loose rings positioned exterior from and in contact with integral facing pipe flanges as depicted in FIG. 2. Beneficially the projections 27, 28, 27*a* and 28*a* are disposed in a generally planar manner in a plane lying generally normal to the plane of the clamp 11.

In FIG. 2 there is depicted a fractional view of the clamp 10 of FIG. 1 in engagement with a pipe assembly, the pipe assembly being generally designated by the reference numeral 30. The pipe assembly 30 comprises a first pipe portion 31 having disposed thereon a loose ring receiving member 16. A similar pipe end 35 is disposed in opposed facing relationship to the pipe portion 31. The end 35 has a loose ring 36, pipe flange 37 and a liner portion 38. In use of a clamp in accordance with the present invention, pipe ends are positioned in approximate facing relationship. One hand grasps the clamp in the open position, forces it against the pipe ends, the pipe ends being forced into the members 16 and 17 by means of the user's other hand; the toggle clamp closed to clamp the pipe ends in mating facing relationship as depicted in FIG. 2. A split "V" clamp is then applied to the loose rings 32 and 36 to maintain the adjacent pipe ends in desired fixed relationship to each other. The toggle clamp 10 is then opened and removed from the pipe ends.

Figure 3:
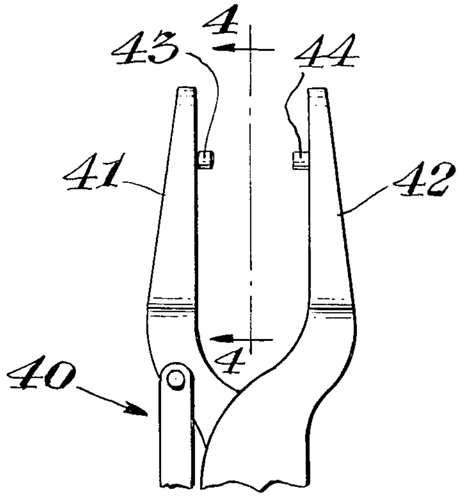
FIG. 3 is a fractional schematic representation of an alternate embodiment of the invention.

FIG. 3 shows a fractional view of an alternate embodiment of the invention designated by the numeral 40. The clamp 40 has a first jaw 41, and a second jaw 42. The jaws 41 and 42 are opposed and bifurcated and closed by means of a toggle mechanism not shown. The jaws 41 and 42 are selectively moved toward or away from each other and when moved toward each other are locked at a desired fixed spacing by means of a toggle mechanism not shown. Each of the jaws 41 and 42 has opposed flange engaging projections 43 and 44.

Figure 4:
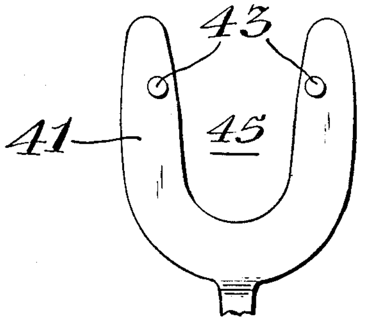
FIG. 4 is a face view of a bifurcated jaw of the clamp of FIG. 3.

FIG. 4 depicts a face view of bifurcated jaw 41 which defines a pipe receiving recess 45 and has two generally opposed flange engaging projections 43, one disposed on either side of the pipe receiving recess 45.

Pipe clamps in accordance with the present invention are readily prepared in the hereinbefore described manner using any one of a variety of toggle clamp mechanisms. As depicted in FIG. 1 the mechanism shown is that of a common commercially available clamping means used with pliers and a variety of clamps and other manually operated jaw variations. Any of a wide variety of manually operated toggle clamps having opposed jaws are readily modified to provide clamps in accordance with the present invention.

Pipe alignment clamps or tools in accordance with the present invention provide a rapid and ready means of aligning adjacent flanged pipe ends to be joined.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A pipe clamp and pipe aligning means comprising a clamp operated with toggle action having first and second opposed jaws at least one of which is pivotally attached to the clamp, the opposed jaws each being bifurcated to provide first and second jaw portions defining therebetween a pipe receiving recess, the jaw portions defining pipe receiving recesses each having an opposed end face with at least two flange or ring engaging portions extending from such end face and substantially normal to the end face, and further, extending towards the opposed end face of the other jaw portion, the projections being positioned to engage a ring or flange on closing of the clamp at generally diametrically opposed locations, on closing of the clamp the recesses being coaxially disposed, said locations lying in the plane normal to a plane formed by the arc made on closing the pivotally attached jaw of the clamp.

2. The pipe of claim 1 wherein said clamp is adjustable.

3. The pipe clamp of claim 1 wherein the first and second jaw portions have the form of a semicylindrical shell.

* * * * *

UNITED STATES PATENT AND TRADEMARK OFFICE

CERTIFICATE OF CORRECTION

PATENT NO. : 4,872,709

DATED : October 10, 1989

INVENTOR(S) : Eugene V. Stack

It is certified that error appears in the above-identified patent and that said Letters Patent is hereby corrected as shown below:

Column 2, line 42, between the words "ring" and "receiving" insert therefore --32, a flange 33 and a liner portion 34 supported in the pipe--.

Signed and Sealed this

Tenth Day of December, 1991

*Attest:*

HARRY F. MANBECK, JR.

*Attesting Officer*

*Commissioner of Patents and Trademarks*